2,710,843
METHOD OF REMOVING A SILOXANE RESINOUS COATING FROM A TIN SURFACE

Leo Frederick Stebleton, Chicago, Ill., assignor to Dow Corning Corporation, Midland, Mich., a corporation of Michigan No Drawing. Application September 14, 1949, Serial No. 115,760

4 Claims. (Cl. 252—153)

This invention relates to a method of cleaning tin surfaces.

One of the outstanding uses for polysiloxane resins is in the baking industry. It has been found that bread will release readily from pans which have been coated with a siloxane resin. The release takes place without the use of any grease and is effective for more than 200 successive bakes. Once bread begins to stick to the coated pans, they may be wiped clean and recoated with the resin. However, after several coats have been applied, it is found that the number of bakes before sticking occurs is greatly reduced. Thus, it is necessary, after several coatings, to entirely remove the glaze and apply a fresh coat.

Whereas alkaline materials will dissolve siloxane resins, these materials also attack tin. Consequently, past attempts to remove siloxane resins from bread pans have proved to be unsatisfactory due to loss of tin. This is a serious defect in that the bakers are not satisfied with loaves produced in pans from which the tin coating has been removed. Methods have been devised for removing the glaze without removing tin but these involve the use of expensive machinery consequently seriously limiting the applicability of the process.

It is an object of this invention to provide an economical method for removing siloxane glaze from a tin surface without attack on the tin and without the use of expensive machinery. It is a further object to provide a method which may be employed by individual bakeries for removal of siloxane glaze from bread pans.

In accordance with this invention an organo-siloxane resin coating is removed from a tin surface by contacting the coated surface with a solution of an alkali metal hydroxide in a liquid glycol ether containing less than 1 percent by weight water and having an open cup flash point of at least 90° C. The concentration of the alkali is such that the pH of the solution is at least 11.

In the practice of this invention the object to be cleaned may be immersed in the alkaline glycol ether solution. Removal of the siloxane begins at once and takes place at temperatures ranging from 30° C. up. Preferably, for safety reasons, the temperature employed should be below the flash point of the solvent. Complete removal of the glaze takes place in 30 seconds to 2 hours depending upon the temperature employed and the concentration of the alkali. The object may then be removed from the solution and rinsed with water.

The glycol ethers employed in the method of this invention are of the type $RO(R'O)_nX$ where $R'$ is an alkylene radical, R is alkyl or monocyclic aryl, $n$ has an average value of at least one and X is alkyl, monocyclic aryl or hydrogen. For the purpose of this invention the ethers should have a flash point of at least 90° C. which corresponds to that of an ether having at least 7 carbon atoms per molecule. It has been found that the above glycol ethers having less than 7 carbon atoms per molecule when employed alone are excellent solvents for the removal of the siloxane resins, however they are undesirable because they also cause removal of the tin. The presence of limited amounts of the ethers having less than 7 carbon atoms is not objectionable provided the flash point of the mixture is at least 90° C.

Specific examples of the above defined glycol ethers which are operative in the present process are:

Tripropylene glycol monomethyl ether
Dipropylene glycol monoethyl ether
Tripropylene glycol monoethyl ether
Dipropylene glycol monoisopropyl ether
Tripropylene glycol mono-n-butyl ether
Propylene glycol monophenyl ether
Ethylene glycol monophenyl ether
Ethylene glycol mono-p-tert-butylphenyl ether
Propylene glycol mono-o-chloro phenyl ether
Ethylene glycol monobenzyl ether
Tetraethylene glycol dimethyl ether
Ethylene glycol dibutyl ether
Diethylene glycol diphenyl ether
Triethylene glycol dipropyl ether It is important that the ether contain less than 1 percent by weight water. If water is present in excess of this amount, tin removal will occur. Excess water may be removed by heating the solvent at a temperature of 100° C. for a period of 15 minutes or longer.

It has been found that other alkaline materials such as quaternary ammonium hydroxides, will remove the siloxane resin without attacking tin. However, these materials are thermally unstable and thus, it is necessary to employ them at temperatures below about 85° C. At such temperatures it requires about 45 minutes or longer to satisfactorily remove the siloxane resin. Consequently, in practical operations in a bakery, these quaternary ammonium bases are not desirable.

Alkali metal hydroxides are preferred alkaline agents in the present process. These are dissolved in the glycol ether in amount sufficient to give a pH of at least 11. Below this value removal of the siloxane is negligible. The preferred pH range is from 13 to 15. At the higher concentration removal of the siloxane resin will take place in shorter periods of time at any given temperature.

The alkali metal hydroxide may be added to the glycol ethers either in the solid state or as an aqueous solution. If an aqueous solution is employed, care must be taken that the water content shall be below 1 percent by weight at the time of use.

The process of this invention may be carried out with the maximum of speed and efficiency and a minimum of hazard. In practice, bread pans have been completely stripped of the siloxane glaze in 60 seconds without any deleterious effect on the tin plating. Since the solvents employed are high boiling, there is no serious fire hazard nor danger of injury from toxic vapors. The process is simple so that it may be carried out in any bakery and thereby reduce the cost of cleaning of the pans.

The following examples are illustrative only.

EXAMPLE 1

A strip of tin plated steel was coated with a methylphenylsiloxane resin and baked until a smooth non-tacky, firmly-adherent film was obtained. The strip was then placed in a solution of 4 percent by weight benzyl trimethyl ammonium hydroxide in tripropylene glycol monomethyl ether and allowed to remain 45 minutes at 30° C. The strip was then removed and rinsed with water. All of the siloxane had been removed from the surface of the strip as shown by the fact that the surface was no longer hydrophobic. No tin had been removed.

EXAMPLE 2

Tin plated steel strips were coated with a methyl phenyl siloxane resin and baked until the resin had set to a non-tacky firmly-adhering coat. The siloxane was then removed from the strips by immersing them in a 1 percent solution of NaOH or KOH in the glycol ethers shown in Table I.

Table I

KOH

Tripropylene glycol monomethyl ether

| | | |
|---|---|---|
| Time in Sec. | 30 | 60 |
| Temp., °C | 102 | 102 |
| Percent Siloxane removed | 60 | 100 |
| Tin removed | | none |

NaOH

Tripropylene glycol monomethyl ether

| | | | | |
|---|---|---|---|---|
| Time in Sec. | 30 | 50 | 60 | 80 |
| Temp., °C | 103 | 103 | 102 | 103 |
| Percent Siloxane removed | 10 | 80 | 90 | 100 |
| Tin removed | | | | none |

KOH

Tripropylene glycol monoethyl ether

| | | |
|---|---|---|
| Time in Sec. | 40 | 60 |
| Temp., °C | 105 | 105 |
| Percent Siloxane removed | 50-60 | 100 |
| Tin removed | | none |

NaOH

Tripropylene glycol monoethyl ether

| | | | |
|---|---|---|---|
| Time in Sec. | 30 | 60 | 80 |
| Temp., °C | 102 | 103 | 103 |
| Percent Siloxane removed | 40 | 60 | 100 |
| Tin removed | | | none |

In the above table the complete removal of a siloxane was shown by the hydrophillic nature of the metal strips after treatment.

EXAMPLE 3

A siloxane coated tin plated steel strip was placed in a solution containing 0.75 percent by weight KOH in a mixture of 80 percent by weight tripropylene glycol monomethyl ether and 20 percent by weight propylene glycol methyl ether. The solution was heated to 100° C. and after 30 seconds the strip was removed and rinsed with water. All of the siloxane had dissolved and no tin had been removed.

EXAMPLE 4

The procedure of Example 3 was repeated except that the solvent employed was tetraethylene glycol dimethyl ether. The solution was heated at 105° C. and after 1 minute the metal strip was removed and rinsed with water. All of the siloxane had been removed and no tin attack had occurred.

EXAMPLE 5

A tin plated steel strip was coated with a methyl phenyl siloxane resin and baked until a non-tacky firmly-adhering coat was obtained. The strip was then placed in a solution of 0.75 percent by weight KOH in ethylene glycol monophenyl ether and the solution was heated at 105° C. for 30 minutes. The strip was removed and rinsed with water. All of the siloxane coat had disappeared and no tin attack had taken place.

*Example 6*

Six bread pans which had been coated with from 2 to 5 coats of a methyl phenyl siloxane resin, were employed in baking until the bread began to stick. The pans were then cleaned by the following process: 3.67 pounds of flake KOH was added to 240 pounds of tripropylene glycol monomethyl ether and the mixture was stirred and heated for one hour at 94° C. The KOH completely dissolved to give a solution having a pH of 13.4. The coated pans were then placed in the solution and the temperature was maintained at 94° C. After from 2 to 10 minutes the pans were removed, allowed to drain and rinsed with cold water. All of the siloxane had been removed and there was no tin attack.

The pans were then recoated with the siloxane resin and were found to give the same number of bakes without sticking as when they were originally coated.

That which is claimed is:

1. A method of removing a hardened siloxane resinous coating from a tin surface without causing tin attack which comprises contacting the coated surface for at least 30 seconds with a solution of an alkali metal hydroxide in a liquid glycol ether containing less than 1 percent by weight water and having an open cup flash point of at least 90° C., the alkali metal hydroxide being present in such amount that the pH of the solution is at least 11, said ether being of the formula RO(R'O)$_n$X where R is selected from the group consisting of alkyl and monocyclic aryl radicals, R' is an alkylene radical having from 2 to 3 carbon atoms, $n$ has a value of at least 1 and X is selected from the group consisting of alkyl and monocyclic aryl radicals and hydrogen said glycol ether having at least seven carbon atoms.

2. A method of removing a hardened siloxane resinous coating from a tin surface without causing tin attack which comprises immersing the object to be cleaned in a 1 per cent by weight solution of sodium hydroxide in tripropylene glycol monomethyl ether, said solution containing less than 1 per cent by weight of water, removing the object from the solution and rinsing with water.

3. A method of removing a hardened siloxane resinous coating from an object having a tin surface without causing tin attack which comprises immersing the object to be cleaned in a 0.75 to 1.5% by weight solution of an alkali metal hydroxide in the balance tripropylene glycol monomethyl ether, said solution containing less than 1% by weight of water, removing the object from the solution, and rinsing with water.

4. A method of removing a hardened siloxane resinous coating from an object having a tin surface without causing tin attack which comprises immersing the object to be cleaned in a 0.75 to 1.5% by weight solution of an alkali metal hydroxide in the balance liquid glycol monoalkyl ether, said solution containing less than 1% by weight of water, removing the object from the solution, and rinsing with water.

References Cited in the file of this patent

UNITED STATES PATENTS

| | | |
|---|---|---|
| 2,432,665 | Hyde | Dec. 16, 1947 |
| 2,445,064 | Hall et al. | July 13, 1948 |